United States Patent Office 3,324,835
Patented June 13, 1967

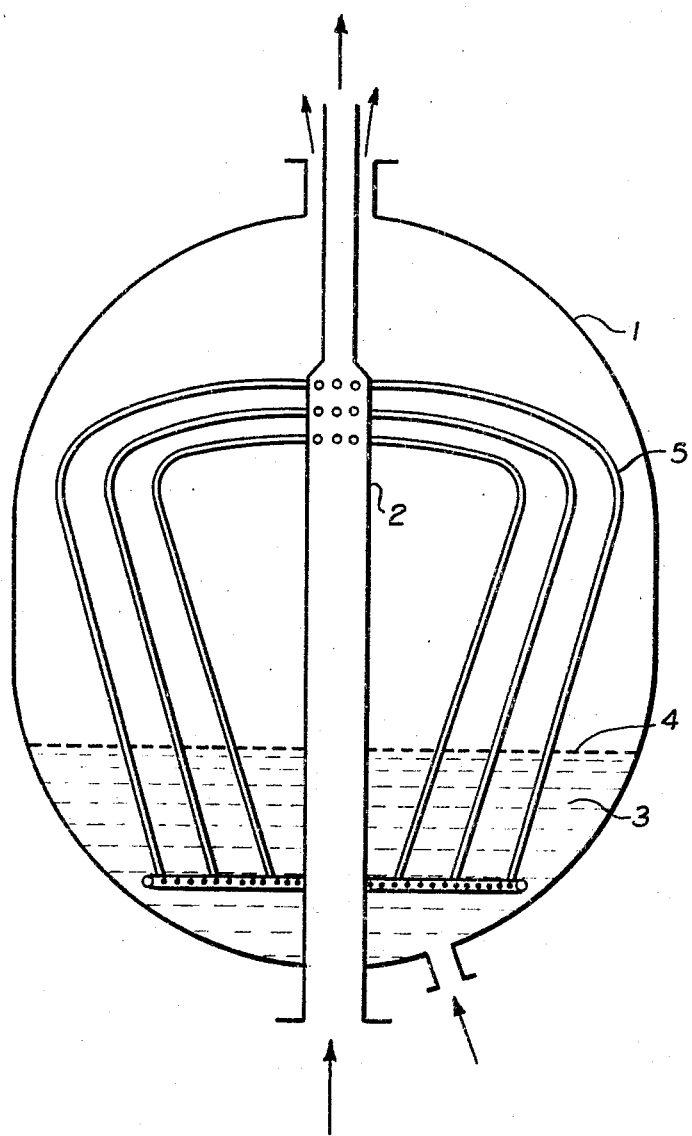

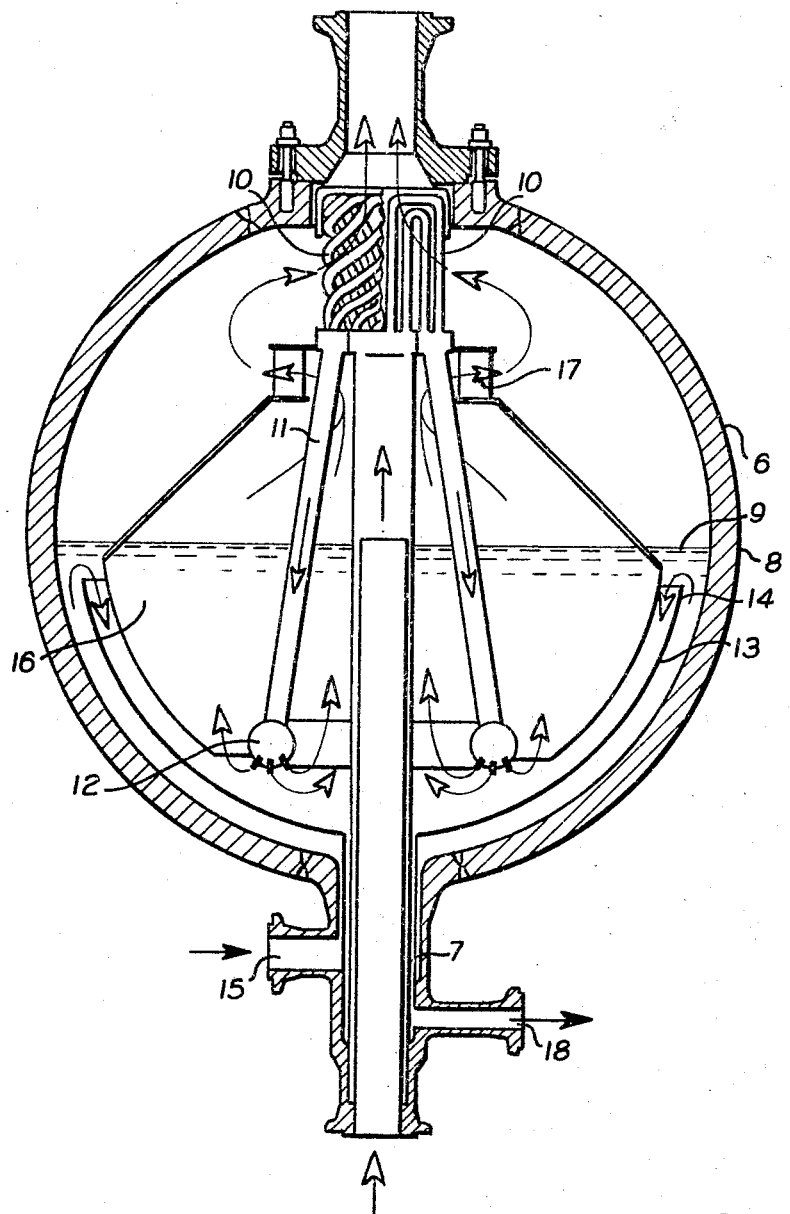

3,324,835
STEAM GENERATOR, PARTICULARLY IN CIRCUITS FOR NUCLEAR REACTORS
Ludolf Ritz, Karlsruhe, Germany, assignor to Gesellschaft Fuer Kernforschung m.b.H., Karlsruhe, Germany, a corporation of Germany
Filed Nov. 7, 1963, Ser. No. 322,253
Claims priority, application Germany, Nov. 8, 1962, K 48,180; Mar. 5, 1963, K 49,115
6 Claims. (Cl. 122—31)

The invention refers to a steam generator, especially in circuits for nuclear reactors, where part of the steam superheated in the circuit is fed through the condensate to be evaporated. In order to minimize the cost of erection and operation of a steam plant where mechanical or electric energy is to be generated by means of a steam power plant, especially a turbine, one aims at feeding the steam superheated within the superheater, i.e. the reactor core in nuclear reactors, directly to the turbine, if possible, without passing it through heat exchangers or the like. As a rule, a condenser is installed in the cycle after the power stage. The condensate arising in this stage which is sometimes supplemented by fresh water is evaporated again before being recycled to the superheater.

It is the aim of this invention to design an evaporator arrangement permitting evaporation of the condensate or water, respectively, in a particularly simple way. Above all, a simple and easily controlled setup is aimed at.

In the steam generator designed to this invention part of the steam superheated in the circuit is also fed through the condensate to be evaporated. In the invention the steam generator consists of a vessel penetrated by at least one tube containing superheated steam and provided with branching pipes, where at least part of the branching pipes is installed in the outlet side of the generated steam and is discharged openly into the condenser or the condensate, respectively. In one particularly favourable design of the steam generator according to this invention several branching pipes branch off one tube penetrating centrally through the vessel, they are connected via control devices. The vessel in this case for instance has a cylindrical shape and is closed by at least nearly hemispherical end caps at its ends. One shape especially well suited to sustain high pressures has been designed in such a way as to have the cylindrical part practically vanish so that the vessel essentially forms a sphere.

In one advanced design according to this invention at least part of the branching pipes extend from the upper free space to near the bottom of the vessel where the outlet openings of the branching pipes form a nearly coaxial ring around the steam inlet tube. Another very favourable solution would be to assemble the branching pipes in groups, preferably above the water level, and combine these to shrouds feeding the superheated steam to a steam outlet ring near the bottom of the vessel. In order to safeguard uniform distribution of the feed water or its uniform introduction, respectively, in the steam outlet opening two guide screens have been provided in the steam generator, nearly parallel with the bottom of the vessel, first, for distributing the water uniformly over the whole volume and then feeding it in a circular opening in the region of the steam outlet ring into the steam generator space proper.

The tube carrying the superheated steam penetrates axially through the upright vessel, and the condensate fills only part of the container, the filling degree of the container may be controlled. Preferably the branching pipes are arranged spirally, mainly above the condensate to be evaporated so that the saturated steam originating from the heated condensate is dried a second time in this upper half of the vessel.

More details are explained on the basis of the drawings:
FIG. 1 shows an almost cylindrical, upright vessel 1 axially penetrated by a central tube 2 carrying saturated steam. The condensate 3 fills the vessel up to the level 4, the height of this level being adjustable by the control devices not shown in detail here. Above the level two branching pipes 5 branch off the central tube 2, they are preferably given the shape of a spiral. It is advisable here to control the amount of superheated steam flowing through the branching pipes by well-known control devices.

It is favourable to arrange the branching pipes in such a way as to safeguard that the hot steam is introduced out of these tubes into the condensate as uniformly as possible. Generally, the condensate will be preheated to boiling temperature so that in mixing superheated steam from the branching pipes with the condensate preheated to boiling temperature saturated steam will be formed. Preheating can be done at least in part in the central tube.

The saturated steam emerging from the condensate is dried in the branching tubes situated in the upper free space of the vessel and under certain circumstances even slightly superheated. The degree of dryness or superheating can be adjusted by proper setting of the condensate level.

FIG. 2 shows a steam generator designed according to this invention the spherical vessel 8 of which is nearly completely penetrated axially by the central tube 7 carrying superheated steam. Condensate fills the vessel 8 up to level 9. Above level 9 the branching pipes 10 branch off the central tube 7. FIG. 2 shows two possibilities of designing these branching pipes. Above the water level the branching pipes 10 are combined to groups so as to form shrouds. These then carry the superheated steam to an outlet ring 12 near the bottom of the vessel. Furthermore, vessel 6 contains two nearly hemispherical guide screens 13, 14 which distribute the feed water entering through opening 15 first throughout the volume of the vessel and then feed it into the steam generating space 16 proper via a circular area in the region of the steam outlet ring 12. The inner guide screen 14 also divides the upper free vapor space so that the steam generated in space 16 can only find an outlet in the frustum of the cone end 17 of the guide screen 14, is fed past the branching pipes here for a second drying and then transported to outlet 17. Outlet 17 from the steam generating space 16 is best designed so as to form a mechanical trap to separate the coarser drops separated from the steam already in this stage and recycled into the condensate via the outside surface of the guide screen 14.

A connection piece 18 has been provided in the bottom of the container which serves for operating a servo circuit for the condenser. If, e.g., after shutdown of the reactor the decay heat is to be drawn off the reactor, heat is continuously removed from the condensate through this servo cycle by circulation through a radiator.

The possibilities of designing a steam generator according to this invention are not restricted to the examples quoted. It may be suitable under certain circumstances to have the branching pipes emerge from the central shroud above the vessel so that they also penetrate into part of the saturated-steam outlet tube. It is also possible to have a different design of branching pipes in the upper half of the vessel, it may be meander-shaped, e.g., instead of having the form of a spiral. Generally, it will be an advantage to make all control steps automatic.

A control device can be installed in the inlet of the condensate line to the steam generator, for adjusting the level of the condensate in the vessel, so that the degree of superheating of the steam can be controlled. An automatic device can be used for this control.

The steam generator designed according to this invention is especially well suited for utilization in steam cycles of nuclear reactors. It may be used, however, also in any other type of steam cycle by the right type of adaptation.

I claim:

1. Steam generator suitable for evaporating water by use of superheated steam, comprising a vessel having a lower portion for holding water to be evaporated and, in communication therewith, an upper portion for receiving steam generated by evaporation of water in said lower portion, an outlet from said upper portion for removal of generated steam therefrom, a tube for carrying superheated steam disposed in said vessel and extending to an upper part of said upper portion, a plurality of branch pipes each in communication with said tube in said upper part of the upper portion of the vessel and extending radially outwardly and downwardly therefrom through the upper portion into said lower portion, means for discharging superheated steam into said lower portion from the branch pipes for discharging superheated steam into water contained in said lower portion, an inlet in said lower portion of the vessel for introducing water to be evaporated into the vessel, an outer guide screen disposed adjacent to the inner wall of the vessel adjacent thereto, defining a course for the water over the extent of the vessel inner surface from said inlet to the upper part of said vessel lower portion, an inner screen guide disposed adjacent to the outer screen guide inwardly thereof and adjacent thereto for receiving water issuing from the outer screen guide in the upper part of said vessel lower portion and conveying it to adjacent said means for discharging superheated steam into the lower portion of the vessel.

2. Steam generator according to claim 1, said branch pipes being turned to provide increased surface area thereof in said upper portion.

3. Steam generator according to claim 1, said means for discharging superheated steam into said lower portion comprising a manifold communicated with the branch pipes for receiving steam therefrom and being perforated at spaced intervals for discharge of steam therefrom.

4. Steam generator according to claim 1, said branch pipes passing adjacent to said outlet for steam from the upper portion, the branch pipes adjacent the outlet each dividing into a number of conduits connected in parallel, for providing increased heat transfer area adjacent said outlet for drying of steam leaving the upper portion.

5. Steam generator according to claim 1, and including a frusto-conical baffle diverging downwardly and joined at its lower periphery to said second screen guide, the upper periphery thereof terminating adjacent the locus of communication between said branch pipes and said tube.

6. Steam generator according to claim 5, said tube passing upwardly through the vessel to said locus of communication of the tube and said branch pipes.

References Cited

UNITED STATES PATENTS

| | | | |
|---|---|---|---|
| 621,037 | 3/1899 | Curtis | 261—159 |
| 1,808,424 | 6/1931 | Manifold | 122—31 |
| 2,868,523 | 1/1959 | Cundiff et al. | 122—31 |

FOREIGN PATENTS

| | | |
|---|---|---|
| 413,544 | 5/1925 | Germany. |
| 58,609 | 12/1946 | Netherlands. |

KENNETH W. SPRAGUE, *Primary Examiner.*

FREDERICK L. MATTESON, JR., *Examiner.*